Dec. 27, 1966  H. WINDOWS, JR  3,293,976
EMBOUCHURE MIRROR
Filed Dec. 18, 1964
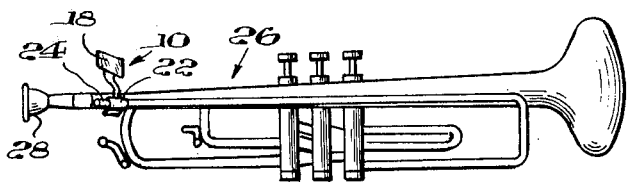
Fig. 1.
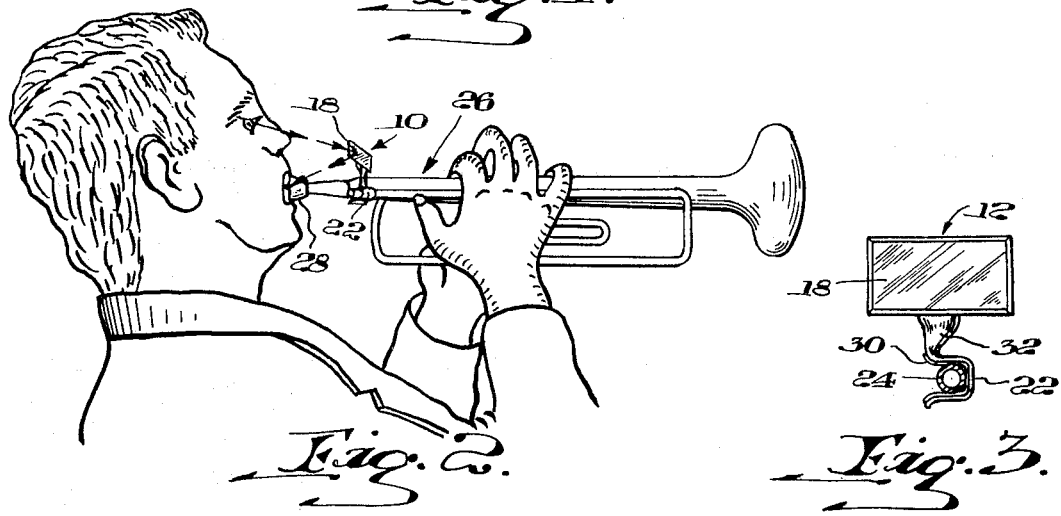
Fig. 2.
Fig. 3.
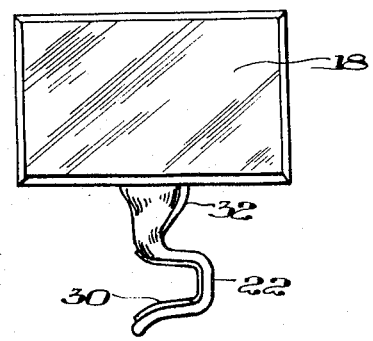
Fig. 4.
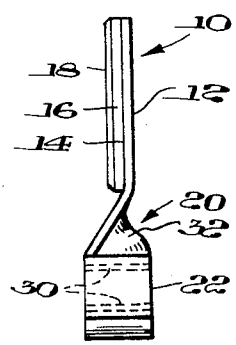
Fig. 5.
INVENTOR.
HOWARD WINDOWS JR.
BY Stanley J Price
his ATTORNEY.

United States Patent Office 3,293,976
Patented Dec. 27, 1966

3,293,976
EMBOUCHURE MIRROR
Howard Windows, Jr., R.D. 4, Box 296,
Tarentum, Pa. 15084
Filed Dec. 18, 1964, Ser. No. 419,317
4 Claims. (Cl. 84—453)

This invention relates to an embouchure mirror and more particularly to an embouchure mirror adapted to be removably secured to a wind instrument, such as a clarinet, oboe, trumpet or the like.

An embouchure is the shaping of the lips, tongue and other organs in producing a musical tone on a wind instrument. The embouchure to a wind instrument player can be equated to the vocal chords to a vocalist and it is believed that the embouchure is one of the major factors in the proper production and control of tone and musical sounds in a wind instrument. The embouchure must be developed through the proper use and development of the organs involved in playing a wind instrument. It has been found that each player of a wind instrument has a different embouchure and what may be proper or suitable for one individual may not be suitable for another individual. The embouchure must, therefore, be developed through the trial and error method. The student should, therefore, maintain a continued close observation of his embouchure during practice to determine what embouchure is the best for him. It is, therefore, highly desirable that both the beginning students and the advanced students of wind instruments continuously observe their embouchure while practicing the wind instrument. Each new embouchure position must be observed in order that the student may refer to the most suitable position for the tonal qualities desired on the wind instrument and it is highly desirable that the student's embouchure be observed at close range so that relatively small or minor changes in the lip position can be readily observed.

Although the importance of observing the embouchure during practice has been known in the past, conventional means such as the student standing before a wall mirror or the like have been utilized to attempt to observe the embouchure during practice of the wind instrument. This practice has not proved entirely satisfactory since the student is unable to carefully observe the minor changes in the lip position and the relative position of the wind instrument mouthpiece to the upper and lower lips.

To circumvent this difficulty, it has been suggested that the student hold a mirror in one hand while he practices the instrument with the other hand. This latter procedure is cumbersome in that the student is deprived of the use of the other hand as a means for supporting and manipulating the instrument and assisting in applying the proper pressures of the mouthpiece to the lips.

Accordingly, it is the principal object of this invention to provide a means whereby a student of a wind instrument may continuously observe the embouchure at close range while playing or practicing the wind instrument and to note and observe minor changes or differences in the embouchure.

These and other objects and novel features of this invention will appear more fully from the following detailed description when the same is read in connection with the accompanying drawings. It is to be expressly understood, however, that the drawings are not intended as a definition of the invention, but are for the purpose of illustration only.

In the drawings:

FIGURE 1 is a view in side elevation of a trumpet with the embouchure mirror positioned thereon.

FIGURE 2 is a view of a student playing a wind instrument with the embouchure mirror mounted thereon and illustrating by means of directional arrows the manner in which the student continuously observes the embouchure.

FIGURE 3 is a view in front elevation of the embouchure mirror as it is mounted on a tubular section of the wind instrument.

FIGURE 4 is an enlarged detail view in front elevation of the embouchure mirror and the support means therefor.

FIGURE 5 is a view in side elevation of the embouchure support device.

Referring to the drawings and particularly to FIGURES 3, 4 and 5, there is illustrated an embouchure mirror support device generally designated by the numeral 10 that has a rectangular body portion 12 with a front planar surface 14. The support device is preferably fabricated of metal having a limited amount of resiliency for the purpose, later discussed. Secured to the front planar surface of the body portion 12 is a rectangular mirror 16 that has a reflective surface 18.

Depending downwardly from the body portion 12 is an arm member generally designated by the numeral 20 that preferably is integrally formed with the body portion 12. The arm member 20 has an arcuate curved end portion 22 that is arranged to extend around the tubular portion 24 of the wind instrument 26 adjacent to the instrument mouthpiece 28. Secured to the inside of the arcuate curved portion 22 is a cloth-like liner 30 that provides a frictional clamp for the arcuate curved portion 22 on the instrument tubular portion 24. The arm member 20 has a twisted portion 32 between the arcuate curved end portion 20 and the body portion 12 so that the curved end portion 22 is substantially perpendicular to the planar body portion 12.

The embouchure mirror support device 10 is arranged to be positioned on the wind instrument 26 adjacent the mouthpiece 28 with the mirror reflective surface 18 facing the mouthpiece 28. When the embouchure mirror support device 10 is so positioned, the student, as is illustrated in FIGURE 2, readily observes the embouchure through the embouchure mirror 16.

The mirror support device arcuate curved end portion 22 has a configuration that encompasses a portion of the musical instrument tubular portion 24 and is frictionally engaged thereto. The cloth-like liner 30 prevents metal to metal contact between the mirror support device 10 and the instrument tubular portion 24.

According to the provisions of the patent statutes, the principle, preferred construction, and mode of operation of the invention have been explained and what is considered to represent its best embodiment has been illustrated. However, it should be understood that, within the scope of the appended claims, the invention may be practiced otherwise than as specifically illustrated and described.

What is claimed is:
1. An embouchure monitoring device having
   a body portion with a planar surface,
   a clamp member extending from said body portion,
   said clamp member adapted to engage the tubular portion of a wind instrument adjacent to the wind instrument mouthpiece,
   said clamp member arranged when secured to the wind instrument tubular portion to position said body portion planar surface in a plane substantially normal to the longitudinal axis of said wind instrument tubular portion, and
   said body portion planar surface having a reflective surface for the player of the wind instrument to con- tinuously observe the embouchure while playing the wind instrument.

2. An embouchure monitoring device having
a body portion with a planar surface,
a clamp member depending from said body portion,
said clamp member adapted to engage a tubular portion of a wind instrument adjacent the wind instrument mouthpiece and position said body portion thereabove,
said clamp member arranged to position said body portion planar surface in a plane substantially normal to the longitudinal axis of said wind instrument tubular portion and facing the wind instrument mouthpiece, and
a mirror secured to the body portion planar surface through which the player of the wind instrument may continuously observe the embouchure while playing the wind instrument.

3. An embouchure monitoring device having
a rectangular body portion with a planar surface,
an arm member depending from said body portion,
said arm member having an arcuate curved resilient end portion adapted to engage the tubular portion of a wind instrument adjacent to the wind instrument mouthpiece and position said body portion thereabove,
said arm member arranged to position said rectangular body portion planar surface in a plane substantially normal to the longitudinal axis of said wind instrument tubular portion and facing the wind instrument mouthpiece, and
a rectangular mirror secured to the body portion planar surface through which the player of the wind instrument may continuously observe the embouchure while playing the wind instrument.

4. A wind instrument having a mouthpiece and a tubular portion extending therefrom,
an embouchure monitoring device connected to said wind instrument tubular portion adjacent to the wind instrument mouthpiece,
said embouchure monitoring device having a rectangular body portion with a planar surface,
an arm member depending from said body portion and having an arcuate curved portion secured to the wind instrument tubular portion thereby positioning said body portion above said wind instrument tubular portion and adjacent to said wind instrument mouthpiece,
said body portion planar surface positioned in a plane substantially normal to the longitudinal axis of the wind instrument tubular portion and facing the wind instrument mouthpiece, and
a rectangular mirror secured to the body portion planar surface through which the player of the wind instrument may continuously observe the embouchure while playing the wind instrument.

References Cited by the Examiner

UNITED STATES PATENTS

| 2,758,496 | 8/1956 | De Mire | 84—398 |
| 2,830,483 | 4/1958 | Saylor et al. | 84—398 |
| 3,164,052 | 1/1965 | De Mire | 84—453 X |

RICHARD B. WILKINSON, *Primary Examiner.*